(12) United States Patent
Rodriguez et al.

(10) Patent No.: US 6,681,028 B2
(45) Date of Patent: *Jan. 20, 2004

(54) PAPER-BASED CONTROL OF COMPUTER SYSTEMS

(75) Inventors: Tony F. Rodriguez, Portland, OR (US); Jonathan Scott Carr, Beaverton, OR (US); Geoffrey B. Rhoads, West Linn, OR (US)

(73) Assignee: Digimarc Corporation, Tualatin, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/314,648

(22) Filed: May 19, 1999

(65) Prior Publication Data

US 2003/0050961 A1 Mar. 13, 2003

Related U.S. Application Data

(63) Continuation-in-part of application No. 09/130,624, filed on Aug. 6, 1998, which is a continuation-in-part of application No. 09/186,962, filed on Nov. 5, 1998, which is a continuation of application No. 08/649,419, filed on May 16, 1996, now Pat. No. 5,862,260, which is a continuation-in-part of application No. 08/637,531, filed on Apr. 25, 1996, now Pat. No. 5,822,436, which is a continuation of application No. 08/508,083, filed on Jul. 27, 1995, now Pat. No. 5,841,978.

(51) Int. Cl.[7] .................................................. G06K 9/00

(52) U.S. Cl. ...................... 382/100; 348/460; 705/27; 710/200

(58) Field of Search ................................. 382/100, 232; 709/217, 219; 380/54, 28; 705/257, 27; 235/462.15, 469, 375; 710/5, 200; 399/13, 366; 348/460, 483; 370/201, 528

(56) References Cited

U.S. PATENT DOCUMENTS

| 3,569,619 A | 3/1971 | Simjian ....................... 235/380 |
| 3,845,391 A | 10/1974 | Crosby |
| 3,984,624 A | 10/1976 | Waggener |
| 4,230,990 A | 10/1980 | Lert, Jr. et al. ................ 725/22 |
| 4,238,849 A | 12/1980 | Gassmann |

(List continued on next page.)

FOREIGN PATENT DOCUMENTS

| CA | 2235002 | 12/1998 |
| EP | 493091 | 1/1992 |
| EP | 493 091 | 7/1992 |

(List continued on next page.)

OTHER PUBLICATIONS

U.S. patent application Ser. No. 60/112,955, filed Dec. 18, 1998, Rhoads.

(List continued on next page.)

Primary Examiner—Jayanti K. Patel
(74) Attorney, Agent, or Firm—William Y. Conwell; Digimarc Corporation

(57) ABSTRACT

Digital data is steganographically encoded in printed materials, and—when sensed by an appropriately-equipped webcam or other imaging device—can be used to link to associated electronic resources. Data hidden in a business card, for example, may enable linking to a person's electronic calendar—showing the person's schedule availability. Likewise, data hidden in a corporate ID badge may serve to unlock doors at a corporate office, or to enable access to corporate computers. Many other such applications are detailed.

28 Claims, 1 Drawing Sheet

U.S. PATENT DOCUMENTS

| | | | |
|---|---|---|---|
| 4,296,326 A | 10/1981 | Haslop et al. ............... 283/70 |
| 4,297,729 A | 10/1981 | Steynor et al. .............. 360/40 |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,425,642 A | 1/1984 | Moses et al. |
| 4,528,588 A | 7/1985 | Lofberg |
| 4,547,804 A | 10/1985 | Greenberg |
| 4,618,257 A | 10/1986 | Bayne et al. ................. 356/71 |
| 4,672,605 A | 6/1987 | Hustig et al. |
| 4,675,746 A | 6/1987 | Tetrick et al. |
| 4,739,377 A | 4/1988 | Allen ......................... 355/133 |
| 4,750,173 A | 6/1988 | Blüthgen |
| 4,807,031 A | 2/1989 | Broughton et al. |
| 4,855,827 A | 8/1989 | Best |
| 4,879,747 A | 11/1989 | Leighton et al. ............ 713/186 |
| 4,888,798 A | 12/1989 | Earnest |
| 4,908,836 A | 3/1990 | Rushforth et al. |
| 4,908,873 A | 3/1990 | Philibert et al. ............ 382/100 |
| 4,944,036 A | 7/1990 | Hyatt ........................ 367/43 |
| 4,947,028 A | 8/1990 | Gorog |
| 4,969,041 A | 11/1990 | O'Grady et al. |
| 4,972,476 A | 11/1990 | Nathans ...................... 713/186 |
| 4,977,594 A | 12/1990 | Shear |
| 5,023,907 A | 6/1991 | Johnson et al. |
| 5,027,401 A | 6/1991 | Soltesz ....................... 380/54 |
| 5,040,059 A | 8/1991 | Leberl ........................ 348/135 |
| 5,053,956 A | 10/1991 | Donald et al. |
| 5,062,666 A | 11/1991 | Mowry et al. ............... 283/67 |
| 5,095,196 A | 3/1992 | Miyata ....................... 235/382 |
| 5,103,459 A | 4/1992 | Gilhousen et al. |
| 5,113,445 A | 5/1992 | Wang ......................... 380/51 |
| 5,113,518 A | 5/1992 | Durst, Jr. et al. |
| 5,138,712 A | 8/1992 | Corbin |
| 5,146,457 A | 9/1992 | Veldhuis et al. |
| 5,181,786 A | 1/1993 | Hujink ....................... 400/61 |
| 5,200,822 A | 4/1993 | Bronfin et al. ............... 725/22 |
| 5,213,337 A | 5/1993 | Sherman ..................... 463/40 |
| 5,216,724 A | 6/1993 | Suzuki et al. ............... 382/135 |
| 5,243,423 A | 9/1993 | DeJean et al. |
| 5,259,025 A | 11/1993 | Monroe et al. .............. 705/75 |
| 5,262,860 A | 11/1993 | Fitzpatrick et al. |
| 5,280,537 A | 1/1994 | Sugiyama et al. .......... 370/529 |
| 5,288,976 A | 2/1994 | Citron et al. |
| 5,291,243 A | 3/1994 | Heckman et al. ............ 399/3 |
| 5,295,203 A | 3/1994 | Krause et al. ............... 382/248 |
| 5,315,098 A | 5/1994 | Tow ........................... 235/494 |
| 5,319,735 A | 6/1994 | Preuss et al. |
| 5,321,470 A | 6/1994 | Hasuo et al. ................ 399/366 |
| 5,337,361 A | 8/1994 | Wang et al. |
| 5,374,976 A | 12/1994 | Spannenburg ............... 399/366 |
| 5,379,345 A | 1/1995 | Greenberg .................. 455/2.01 |
| 5,385,371 A | 1/1995 | Izawa |
| 5,416,307 A | 5/1995 | Danek et al. ................ 235/449 |
| 5,428,607 A | 6/1995 | Hiller et al. ................. 370/352 |
| 5,428,731 A | 6/1995 | Powers, III |
| 5,463,209 A | 10/1995 | Figh et al. |
| 5,469,222 A | 11/1995 | Sprague ...................... 348/580 |
| 5,469,506 A | 11/1995 | Berson et al. ............... 713/186 |
| 5,493,105 A * | 2/1996 | Desai ......................... 265/375 |
| 5,493,677 A | 2/1996 | Balogh et al. ............ 707/104.1 |
| 5,495,411 A | 2/1996 | Ananda |
| 5,495,581 A | 2/1996 | Tsai |
| 5,496,071 A | 3/1996 | Walsh |
| 5,502,576 A | 3/1996 | Ramsay et al. .............. 358/444 |
| 5,521,722 A | 5/1996 | Colvill et al. ............... 358/500 |
| 5,524,933 A | 6/1996 | Kunt et al. |
| 5,530,759 A | 6/1996 | Braudaway et al. ......... 380/54 |
| 5,530,852 A | 6/1996 | Meske, Jr. et al. |
| 5,548,645 A | 8/1996 | Ananda |
| 5,553,143 A | 9/1996 | Ross et al. |
| 5,559,868 A * | 9/1996 | Blonder ................. 235/462.13 |
| 5,568,550 A | 10/1996 | Ur .............................. 382/306 |
| 5,579,479 A | 11/1996 | Plum |
| 5,594,226 A | 1/1997 | Steger ........................ 235/379 |
| 5,598,526 A | 1/1997 | Daniel et al. ............... 345/540 |
| 5,613,004 A | 3/1997 | Cooperman et al. .......... 380/28 |
| 5,617,119 A | 4/1997 | Briggs et al. ................ 707/100 |
| 5,629,980 A | 5/1997 | Stefik et al. |
| 5,634,012 A | 5/1997 | Stefik et al. |
| 5,636,276 A | 6/1997 | Brugger |
| 5,636,292 A | 6/1997 | Rhoads ........................ 382/232 |
| 5,638,443 A | 6/1997 | Stefik et al. |
| 5,640,193 A | 6/1997 | Wellner |
| 5,646,997 A | 7/1997 | Barton |
| 5,646,999 A | 7/1997 | Saito |
| 5,652,626 A | 7/1997 | Kawakami et al. .......... 348/463 |
| 5,652,714 A | 7/1997 | Peterson et al. |
| 5,657,462 A | 8/1997 | Brouwer et al. |
| 5,659,164 A | 8/1997 | Schmid et al. |
| 5,663,766 A | 9/1997 | Sizer, II |
| 5,664,018 A | 9/1997 | Leighton ..................... 380/54 |
| 5,665,951 A | 9/1997 | Newman et al. ............. 235/375 |
| 5,668,636 A | 9/1997 | Beach et al. ................. 358/296 |
| 5,671,282 A | 9/1997 | Wolff et al. .................. 713/179 |
| 5,673,316 A | 9/1997 | Auerbach et al. ............. 705/51 |
| 5,687,236 A | 11/1997 | Moskowitz et al. .......... 380/28 |
| 5,710,636 A | 1/1998 | Curry .......................... 358/328 |
| 5,715,403 A | 2/1998 | Stefik |
| 5,719,939 A | 2/1998 | Tel .............................. 713/179 |
| 5,721,788 A | 2/1998 | Powell et al. |
| 5,727,092 A | 3/1998 | Sandford, II et al. ....... 382/251 |
| 5,734,119 A | 3/1998 | France et al. |
| 5,735,547 A | 4/1998 | Morelle et al. ............... 283/67 |
| 5,740,244 A | 4/1998 | Indeck et al. ............... 713/176 |
| 5,742,845 A | 4/1998 | Wagner |
| 5,745,604 A | 4/1998 | Rhoads ........................ 382/232 |
| 5,761,686 A | 6/1998 | Bloomberg ................. 707/529 |
| 5,765,152 A | 6/1998 | Erickson |
| 5,768,426 A | 6/1998 | Rhoads ........................ 382/232 |
| 5,774,452 A | 6/1998 | Wolosewicz |
| 5,778,102 A | 7/1998 | Sandford, II et al. |
| 5,790,693 A | 8/1998 | Graves et al. ............... 382/135 |
| 5,790,697 A | 8/1998 | Munro et al. ................ 382/135 |
| 5,801,687 A | 9/1998 | Peterson et al. |
| 5,804,803 A | 9/1998 | Cragun et al. |
| 5,809,160 A | 9/1998 | Powell et al. ............... 382/100 |
| 5,809,317 A | 9/1998 | Kogan et al. |
| 5,817,205 A | 10/1998 | Kaule .......................... 382/294 |
| 5,818,441 A | 10/1998 | Throckmorton et al. |
| 5,819,289 A | 10/1998 | Sanford, II et al. ....... 707/104.1 |
| 5,822,436 A | 10/1998 | Rhoads ........................ 380/54 |
| 5,825,871 A | 10/1998 | Mark ....................... 379/357.03 |
| 5,825,892 A | 10/1998 | Braudaway et al. .......... 380/51 |
| 5,828,325 A | 10/1998 | Wolosewicz et al. |
| 5,832,119 A | 11/1998 | Rhoads ........................ 382/232 |
| 5,838,458 A | 11/1998 | Tsai ............................. 358/402 |
| 5,841,978 A | 11/1998 | Rhoads ........................ 709/217 |
| 5,845,281 A | 12/1998 | Benson et al. |
| 5,848,144 A | 12/1998 | Ahrens ........................ 379/219 |
| 5,848,413 A | 12/1998 | Wolff .......................... 707/10 |
| 5,848,424 A | 12/1998 | Scheinkman et al. |
| 5,852,673 A | 12/1998 | Young |
| 5,857,038 A | 1/1999 | Owada et al. |
| 5,862,218 A | 1/1999 | Steinberg .................... 713/176 |
| 5,862,260 A | 1/1999 | Rhoads ........................ 382/232 |
| 5,869,819 A | 2/1999 | Knowles et al. ............. 235/375 |
| 5,871,615 A | 2/1999 | Harris ......................... 162/140 |
| 5,872,589 A | 2/1999 | Morales |

| | | |
|---|---|---|
| 5,875,249 A | 2/1999 | Mintzer et al. ............... 380/54 |
| 5,892,900 A | 4/1999 | Ginter et al. |
| 5,893,101 A | 4/1999 | Balogh et al. .............. 707/100 |
| 5,893,910 A | 4/1999 | Martineau et al. |
| 5,898,779 A | 4/1999 | Squilla et al. .............. 713/176 |
| 5,900,608 A | 5/1999 | Iida |
| 5,902,353 A | 5/1999 | Reber et al. ................ 709/219 |
| 5,903,729 A | 5/1999 | Reber et al. ................ 709/219 |
| 5,905,248 A | 5/1999 | Russell et al. ......... 235/462.15 |
| 5,905,251 A | 5/1999 | Knowles ............... 235/472.01 |
| 5,905,810 A | 5/1999 | Jones et al. ................. 382/135 |
| 5,913,210 A | 6/1999 | Call ............................. 707/4 |
| 5,915,027 A | 6/1999 | Cox et al. |
| 5,920,861 A | 7/1999 | Hall et al. |
| 5,920,878 A | 7/1999 | DeMont |
| 5,926,822 A | 7/1999 | Garman |
| 5,930,767 A | 7/1999 | Reber et al. .................. 705/26 |
| 5,932,863 A | 8/1999 | Rathus et al. |
| 5,933,798 A | 8/1999 | Linnartz ...................... 702/91 |
| 5,933,829 A | 8/1999 | Durst et al. |
| 5,938,726 A | 8/1999 | Reber et al. ................ 709/217 |
| 5,938,727 A | 8/1999 | Ikeda ......................... 709/218 |
| 5,939,695 A | 8/1999 | Nelson ....................... 235/383 |
| 5,940,595 A | 8/1999 | Reber et al. |
| 5,949,055 A | 9/1999 | Fleet et al. ................. 235/469 |
| 5,950,173 A | 9/1999 | Perkowski ................... 705/26 |
| 5,959,055 A | 9/1999 | Le Blevec et al. .......... 235/469 |
| 5,963,916 A | 10/1999 | Kaplan ........................ 705/26 |
| 5,971,277 A | 10/1999 | Cragun et al. .......... 235/462.01 |
| 5,974,141 A | 10/1999 | Saito |
| 5,974,548 A | 10/1999 | Adams ....................... 713/260 |
| 5,978,773 A | 11/1999 | Hudetz et al. |
| 5,979,757 A | 11/1999 | Tracy et al. ................ 235/383 |
| 5,983,218 A | 11/1999 | Syeda-Mahmoo |
| 5,991,426 A | 11/1999 | Cox et al. ................... 382/100 |
| 5,991,876 A | 11/1999 | Johnson et al. |
| 6,005,501 A | 12/1999 | Wolosewicz ................ 341/52 |
| 6,012,102 A | 1/2000 | Shachar |
| 6,035,177 A | 3/2000 | Moses et al. ................ 725/22 |
| 6,052,486 A | 4/2000 | Knowlton et al. |
| 6,122,403 A | 9/2000 | Rhoads ....................... 382/233 |
| 6,138,151 A * | 10/2000 | Reber et al. ................ 709/219 |
| 6,166,750 A | 12/2000 | Negishi ....................... 347/131 |
| 6,266,430 B1 | 7/2001 | Rhoads ....................... 382/100 |
| 6,286,036 B1 | 9/2001 | Rhoads ....................... 709/217 |
| 6,311,214 B1 | 10/2001 | Rhoads ....................... 709/217 |
| 6,314,457 B1 | 11/2001 | Schena et al. |
| 6,324,574 B1 | 11/2001 | Gong .......................... 709/218 |
| 6,345,104 B1 | 2/2002 | Rhoads |
| 6,408,331 B1 | 6/2002 | Rhoads ....................... 709/217 |
| 2001/0001854 A1 | 5/2001 | Schena et al. |
| 2002/0009208 A1 | 1/2002 | Alattar et al. .............. 382/100 |

FOREIGN PATENT DOCUMENTS

| | | | |
|---|---|---|---|
| EP | 0789480 | 8/1997 | |
| EP | 872995 | 10/1998 | |
| EP | 0642060 B1 | 4/1999 | |
| WO | 94/27228 | 11/1994 | |
| WO | WO94/27228 | 11/1994 | |
| WO | WO95/04665 | 2/1995 | |
| WO | WO95/10813 | 4/1995 | |
| WO | 95/14289 | 5/1995 | |
| WO | 95/20291 | 7/1995 | |
| WO | 96/27259 | 9/1996 | |
| WO | 96/36163 | 11/1996 | |
| WO | WO97/43736 | 11/1997 | |
| WO | WO 97/43736 * | 11/1997 | ............ G06K/9/36 |
| WO | WO98/14887 | 4/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | ................ 382/100 |
| WO | WO 01/80169 | 10/2001 | ................ 382/100 |

OTHER PUBLICATIONS

U.S. patent application Ser. No. 09/074,034, filed May 6, 1998, Rhoads.

U.S. patent application Ser. No. 09/185,380, filed Nov. 3, 1998, Davis et al.

U.S. patent application Ser. No. 09/302,663, filed Apr. 30, 1999, Gustafson et al.

U.S. patent application Ser. No. 09/465,418, filed Dec. 16, 1999, Rhoads et al.

Dautzenberg, "Watermarking Images," Department of Microelectronics and Electrical Engineering, Trinity College Dublin, 47 pages, Oct. 1994.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs. which according to the authors of the paper, was dated Sep. 1994.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tirkel et al, "Electronic Water Mark,"DICTA–93, Macquarie University, Sydney, Australia, Dec., 1993, pp. 666–673.

Kurak et al., "A Cautionary Note On Image Downgrading," 1992 IEEE, pp. 153–159.

"Multimedia Mixed Object Envelopes Supporting a Graduated Fee Scheme via Encryption," IBM Technical Disclosure Bulletin: vol. 37, No. 03, Mar. 1994, p. 413.

Mintzer et al., "Safeguarding Digital library Contents and Users" Digital Watermarking, D–Lib Magazine, Dec. 1997: ISSN 1082–9873.

"Copyright Protection for Digital Images, Digital Fingerprinting from FBI," Highwater FBI brochure, 1995, 4 pages.

"High Water FBI Limited Presentation Image Copyright Protection Software," FBI Ltd brochure, Jul. 1995, 17 pages.

Hudetz U.S. Provisional patent application Ser. No. 60/000, 442, filed Jun. 20, 1995, Method and Apparatus for Interfacing with Remote Computers.

Sheng et al., *Experiments on Pattern Recognition Using Invariant Fourier–Mellin Descriptor*, vol. 3, No. 6, Jun. 1986, J. Opt. Soc. Am., pp. 771–776.

U.S. patent application Ser. No. 60/000,442, Hudetz, filed Jun. 20, 1995.

U.S. patent application Ser. No. 60/082,228, Rhoads, filed Apr. 16, 1998.

U.S. patent application Ser. No. 60/141,763, Davis, filed Jun. 30, 1999.

U.S. patent application Ser. No. 60/158,015, Davis et al., filed Oct. 6, 1999.

U.S. patent application Ser. No. 09/314,648, Rodriguez et al., filed May 19, 1999.

U.S. patent application Ser. No. 09/342,688, Rodriguez et al., filed Jun. 29, 1999.

U.S. patent application Ser. No. 09/342,971, Rodriguez et al., filed Jun. 29, 1999.

U.S. patent application Ser. No. 09/679,261, Davis et al., filed Oct. 4, 2000.

U.S. patent application Ser. No. 09/562,517, Davis et al., filed May 1, 2000.

U.S. patent application Ser. No. 09/547,664, Rhoads et al., filed Apr. 12, 2000.

U.S. patent application Ser. No. 09/571,442, Rhoads et al., filed May 15, 2000.

U.S. patent application Ser. No. 09/858,189, Rhoads et al., filed May 14, 2001.

U.S. patent application Ser. No. 09/631,409, Brundage et al., filed Aug. 3, 2000.

U.S. patent application Ser. No. 09/452,021, Davis et al., filed Nov. 30, 1999.

U.S. patent application Ser. No. 09/629,401, Seder et al., filed Aug. 1, 2000.

U.S. patent application Ser. No. 09/473,396, Evans et al., filed Dec. 28, 1999.

U.S. patent application Ser. No. 09/563,664, Levy et al., filed May 2, 2000.

U.S. patent application Ser. No. 09/670,115, Rhoads et al., filed Sep. 26, 2000.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

Bruckstein, A.M.; Richardson, T. J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Medicine, vol XXIV, No. 4, Oct., 1994, pp. 311–323.

Szepanski, "Additive Binary Data Transmission for Video Signals," Conference of the Communications Engineering Society, 1980, NTG Technical Reports, vol. 74, pp. 343–351. (German text and English translation enclosed).

U.S. patent application Ser. No. 09/765,102, filed Jan. 17, 2001, Shaw.

U.S. patent application Ser. No. 09/761,349, filed Jan. 16, 2001, Rhoads.

U.S. patent application Ser. No. 09/761,280, filed Jan. 16, 2001, Rhoads.

U.S. patent application Ser. No. 09/645,779, Aug. 24, 2000, Tian et al.

U.S. patent application Ser. No. 09/689,226, filed Oct. 11, 2000, Brunk.

U.S. patent application Ser. No. 09/689,250, filed Oct. 11, 2000, Ahmed.

U.S. patent application Ser. No. 09/689,293, filed Oct. 11, 2000, Tian et al.

U.S. patent application Ser. No. 09/625,577, filed Jul. 25, 2000, Carr et al.

U.S. patent application Ser. No. 09/574,726, filed May 18, 2000, Rhoads et al.

U.S. patent application Ser. No. 09/562,524, filed May 1, 2000, Carr et al.

U.S. patent application Ser. No. 09/498,223, filed Feb. 3, 2000, Rhoads et al.

U.S. patent application Ser. No. 09/431,990, filed Nov. 3, 1999, Rhoads et al.

U.S. patent application Ser. No. 09/428,359, filed Oct. 28, 2000, Davis et al.

U.S. patent application Ser. No. 09/342,972, filed Jun. 29, 1999, Rhoads.

U.S. patent application Ser. No. 09/293,602, filed Apr. 15, 1999, Rhoads.

U.S. patent application Ser. No. 09/293,601, filed Apr. 15, 1999, Rhoads.

U.S. patent application Ser. No. 09/287,940, filed Apr. 7, 1999, Rhoads.

U.S. patent application Ser. No. 09/074,034, filed May 6, 1998, Rhoads et al.

U.S. patent application Ser. No. 09/127,502, filed Jul. 31, 1998, Rhoads.

U.S. patent application Ser. No. 60/082,228, filed Apr. 16, 1998, Rhoads.

U.S. patent application Ser. No. 60/198,138, filed Apr. 17, 2000, Alattar.

*Audio Watermarking Architectures for Secure Digital Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG*, Mar. 29, 1999, J. Winograd, Aris Technologies, pp. 1–16.

*Audio Watermarking System to Screen Digital Audio Content for LCM Acceptance, A Proposal Submitted in Response to PDWG99050504–Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's Proposal for SDMI: An Underlying Security System" (slide presentation), Mar. 29, 1999, 23 slides.

*Microsoft Response to CfP for Technology Solutions to Screen Digital Audio Content for LCM Acceptance*, SDMI, PDWG Tokyo, May 23, 1999, 9 pages.

*Response to CfP for Technology Solutions to Screen Digital Audio Content for LCM Acceptance*, NTT Waveless Radio Consotium, May 23, 1999, 9 pages.

Sandford II et al., "The Data Embedding Method", *Proceedings of the SPIE* vol. 2615, pp. 226–259, 1996.

Thomas, Keith, *Screening Technology for Content from Compact Discs*, May 24, 1999, 11 pages.

Tirkel et al., "Electronic Water Mark," *Dicta*–93, Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory, Purdue University*, Sep. 1996, pp. 219–222.

* cited by examiner-

PAPER-BASED CONTROL OF COMPUTER SYSTEMS

RELATED APPLICATION DATA

This application is a continuation-in-part of co-pending application Ser. No. 09/130,624, filed Aug. 6, 1998, which is a continuation of application Ser. No. 08/508,083 filed Jul. 27, 1995 (now U.S. Pat. No. 5,841,978).

This application is also a continuation-in-part of copending application Ser. No. 09/186,962, filed Nov. 5, 1998, which is a continuation of application Ser. No. 08/649,419, filed May 16, 1996 (now U.S. Pat. No. 5,862,260), which is a continuation-in-part of application Ser. No. 08/637,531, filed Apr. 25, 1996 (now U.S. Pat. No. 5,822,436).

The subject matter of this application is generally related to that in all of the assignee's other patents and applications, e.g., U.S. Pat. Nos. 5,841,886, 5,832,119, 5,822,446 and 5,841,978, and the application entitled Methods and Systems Employing Digital Watermarking, filed on even date herewith.

FIELD OF THE INVENTION

The present invention relates to use of printed documents to control computer systems. Exemplary documents include business cards, advertisements, and identification badges, but the invention is not so limited.

BACKGROUND AND SUMMARY OF THE INVENTION

Over the past century, business cards have formed part of business ritual. Functionally, they serve as a record of an encounter, and detail means by which the giver may be contacted (address, phone, etc.).

Business cards have changed, essentially, not at all in response to the advent of computers. Some accommodation has been made for business cards on the computer side, in the form of specialized scanner and optical character recognition tools by which textual data printed on cards can be read and entered into personal productivity software tools (e.g. contact managers, address books, datebooks, personal information managers, etc.). However, the data transferred into the personal productivity software is static and unchanging.

In accordance with one embodiment of the present invention, the textual information on a business card is supplemented with steganographically-encoded, multi-bit binary data. This latter data does not significantly distract from the visual aesthetics of the card (as would a bar code or the like), yet can be used by an associated computer to initiate a link to an internet site corresponding to the business card giver. At the site, the recipient of the card may gain access to the giver's schedule, and other information that changes over time. (Such information may not generally be available over the internet to persons without the card data.)

The foregoing and additional features and advantages of the present invention will be more readily apparent from the following detailed description, which proceeds with reference to the accompanying drawings.

DETAILED DESCRIPTION

Figure 1:
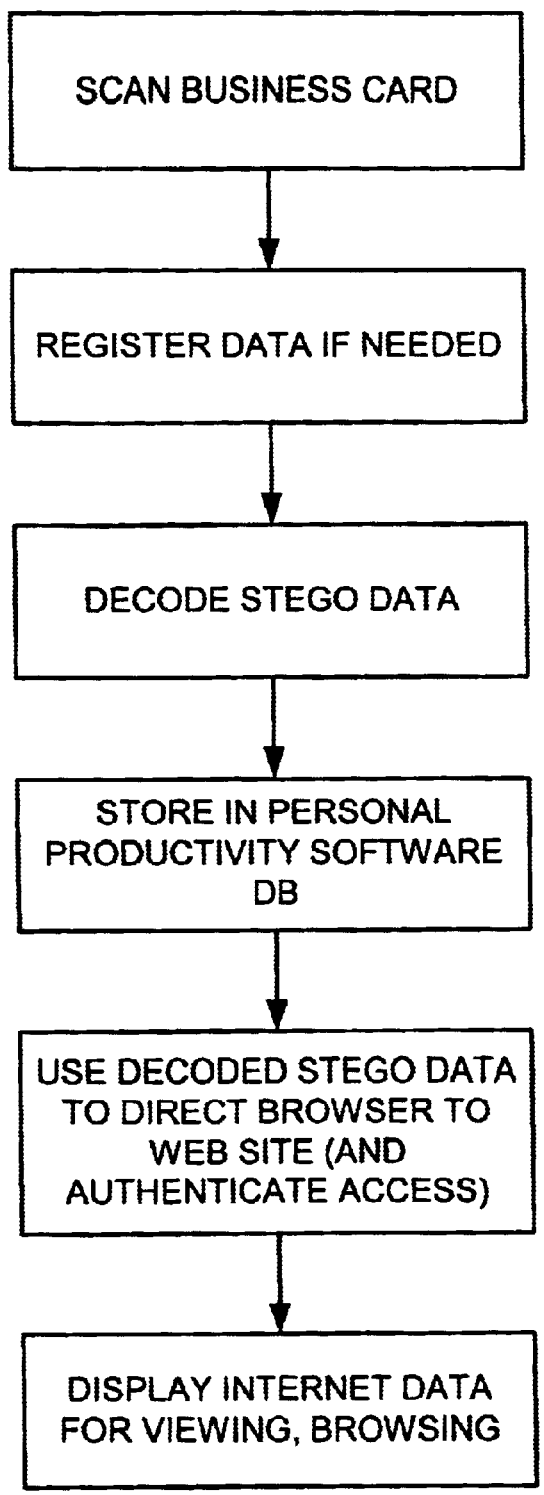
FIG. 1 shows a flow chart of a process according to one embodiment of the present invention.

Digital watermarking is a quickly-growing field of endeavor, and many techniques are known. Generally, all seek to steganographically convey multi-bit data ancillary to some other signal or medium.

The present assignee's prior application Ser. No. 09/127,502, filed Jul. 31, 1998, shows techniques by which very fine lines can be printed on a medium to slightly change the medium's apparent tint, while also conveying digital data. Commonly-owned application Ser. No. 09/074,034, filed May 6, 1998, details how the contours of printed imagery can be adjusted to convey digital data. (That technique can be applied to printed text characters, as well as the line art imagery particularly considered.) Applicant's U.S. Pat. No. 5,850,481 details how the surface of paper or other media can be textured to convey optically-detectable binary data. Applicant's U.S. Pat. Nos. 5,841,886, 5,809,160, and the priority applications detailed above, detail various techniques for steganographically encoding photographs and other imagery.

Three papers by Brassil et al show other techniques for conveying watermark data by slight changes to printed text, "Electronic Marking and Identification Techniques to Discourage Document Copying," Proceedings of INFOCOM '94 Conference on Computer, IEEE Comm. Soc Conference, Jun. 12–16, 1994, pp. 1278–1287; "Hiding Information in Document Images," November, 1995, 7 pages, AT&T Bell Laboratories Technical Report (available at ciss95_ps.z from ftp://ftp.research.att.com/dist/brassil/1995/ciss95.ps.Z.; and "Document Marking and Identification using Both Line and Word Shifting," INFOCOM '95 (available at ftp://ftp.research.att.com/dist/brassil/1995/infocom95.ps.Z).

The foregoing is just a sampling of the large literature on watermarking. The artisan is presumed to be familiar with such art, all of which is generally suitable for use with the novel concepts detailed below.

In accordance with any of the known watermarking techniques, a business card is steganographically encoded with plural bit data. At least part of this data identifies an internet address or web site at which data about the giver of the card is stored. If sufficient bits can be encoded into the business card, the address can be encoded literally, e.g., by ASCII or binary numeric encoding. Alternatively, to reduce the data payload, an abbreviated form of address. One example of such an abbreviated form is a Unique Identifier (UID) which can be, e.g., a 24-bit value.

Desirably, the steganographic encoding is tailored to facilitate decoding in the presence of arbitrary rotation or scale distortion of the card introduced during scanning. (Some such techniques are shown, e.g., in applicant's related patents identified above. Others are known to artisans.)

As shown in FIG. 1, the card is scanned (e.g., by use of conventional opto-electronic devices, such as a scanner or a digital camera). The output data is then optionally processed to account for any skew or scale factor. The plural-bit digital data is then decoded and stored, e.g., in personal productivity software.

(Although not particularly shown in FIG. 1, it is expected that the detailed process will often be supplemental to known OCR-reading of business cards, and entry of the textual data into personal productivity software. That is, the scan data is processed both by OCR techniques, and by steganographic decoding techniques, and the results of both operations stored in a data structure or other memory for later reference.)

The steganographically-decoded plural-bit data is provided to a web browser or other internet appliance and used to initiate a link to a remote computer over the internet's network of computers. If the remote address was literally encoded in the business card, that address is used directly. If an abbreviated form of address was encoded, an additional step may be required.

If a UID was encoded in the card, rather than a literal address, the web browser might consult an index to correlate the UID to an address. The index could be a table or other data structure stored on the user's local computer, but more commonly is a remote name server database to which the browser links as a default when processing business card UIDs. Data obtained from the index is then used to complete the linking to the ultimate destination. (In addition to reducing the business card payload, such linking through an index, e.g., by a UID, offers flexibility in that the ultimate destination can be moved to other server sites as needed, with just a simple update to the index. Alternatively, all business cards encoded with the former address would be rendered obsolete if the site were relocated.)

At the ultimate site, the user is presented with whatever information the business card giver chooses to provide, including biographical information, photos, promotional offers or advertisements relating to the card-giver's business (or relating to enterprises to whom the card-giver has rented screen space), etc., etc. In one embodiment, the giver's site is linked to the giver's personal productivity tool(s) and permits viewing, e.g., of calendar information (showing where the business card giver is scheduled to be today, or for the rest of the week, month, etc.)

Typically, this calendar information is not available to casual web browsers; the steganographically decoded data from the business card includes some authentication data (akin to a password) that permits access to otherwise restricted data. This authentication data can take the form of a web page address to which no publicly-accessible link points, a password that is separately presented to the web server by the user's browser after a link is established, or other known technique.

In one form of the invention, the giver of business cards may have several differently-encoded cards, each with a different level of access authorization. Thus, some cards may access a biographical page without any calendar information, other cards may access the same or different page with access enabled to today's calendar, and still other cards may access the same or different page with access enabled for the card-giver's complete calendar.

The reference to business cards and personal calendars is illustrative only. The invention is more widely applicable. Going back a century, "calling cards" were used by persons whose interests were strictly social, rather than business. The principles of the present invention can similarly be applied. Teenagers can carry small cards that can be exchanged with new acquaintances to grant access to private dossiers of personal information, favorite music, artwork, video clips, etc. The cards can be decorated with art or other indicia that can serve purposes wholly unrelated to the linking data steganographically encoded therein.

Even the "card" paradigm is too restrictive. The same techniques can be applied to any object. A music CD cover can be encoded to point to a promotional site associated with the music artist. A book jacket can link to a similar site. Printed advertising distributed through the US mail (cards, magazines, etc.) can be encoded to point to related web-based promotional sites. (Sponsors of such advertising or other sites can reward visits to their internet site by issuing visitors digital tokens or coupons that can be redeemed for premiums, cash-back, etc., either for any such visit, or only if the visit was effected through the portal of a steganographically-encoded printed medium.)

Many contexts arise in which data to be presented to a consumer is valuable only if timely. The postal service mail is ill-suited for some such information due to the latency between printing a document, and its ultimate delivery to a recipient. The principles of the present invention allow the recipient to take a steganographically-encoded data object (card, etc.) that was printed well before delivery, and use it on receipt to receive up-to-the-minute information. (In this and other embodiments, the steganographically-encoded data can also include data uniquely identifying the recipient/user, so the web site can present data customized to that user.)

The present technology also has application in access control systems. An identification badge (either with photo or graphics, or with text alone) can be encoded with steganographically access control data (e.g., access codes or digital keys) that is recognized by optical-scanner-equipped locks and the like, permitting access by authorized persons to restricted areas or restricted services (e.g., computer privileges). Given the low cost of media and printing (as compared with other access control technologies), the cards can be issued on a daily, weekly, or other frequent interval, and the access control system can be programmed to permit access in response to such cards only for the pre-set limited period. Lost cards soon lose their threat.

Tickets to sporting events, concerts, and other events can be steganographically encoded to permit the bearer to access premium web content available only to those who have purchased tickets (e.g., an on-line text-, audio-, or video-chat session with the featured performer or sports star the day before the event). Alternatively, the encoded data may link to a transactional site. In some such embodiments, the ticket is printed with a nominal show data and seat assignment, but also includes a UID in addition to the encoded address of an associated transactional ticket site. The user then can visit the transactional web site to change seating (or date). On attending the event, the consumer presents the ticket to a steganographic decoder apparatus that discerns the UID and looks up the seat assignment most-recently picked by the consumer. It then prints a chit entitling the consumer to take the seat earlier selected on-line.

The reference to "scanning" of objects naturally brings to mind images of desktop flatbed scanners, or multi-function hydra devices. While such devices can be used—together with convention digital cameras (including video cameras)—the inventors foresee that image input devices will soon be much more commonplace. The provision of digital cameras as built-in components of certain computers (e.g., the Sony Vaio laptops) is just one manifestation of this trend. Another is camera-on-a-chip systems, as typified by U.S. Pat. No. 5,841,126 and detailed in Nixon et al., "256× 256 CMOS Active Pixel Sensor Camera-on-a-Chip," IEEE J. Solid-State Circuits, Vol. 31(12), pp. 2046–2051 (1996), and Fossum, "CMOS Image Sensors: Electronic Camera-on-a-Chip," IEEE Transactions of Electron Devices, vol. 44, No. 10, October 1997. Still another is head-mounted cameras (as are presently used in some computer-augmented vision systems). These and other image input devices can all be used in connection with the present invention.

To facilitate embodiments of the present invention, a prior art camera-on-a-chip system can be modified to also include a steganographic watermark detector on the same semiconductor substrate. Such a chip—in addition to providing image output data—can also analyze the image data to discern any steganographically encoded data, and produce corresponding output data. (Again, such analysis desirably includes correction for scale and rotation factors, so precise positioning of the object being "read" is not essential for correct decoding.)

To provide a comprehensive disclosure without unduly lengthening this specification, applicants incorporate by reference the patents, applications, and publications identified above, except Ser. Nos. 09/186,962; 08/649,419 (now U.S. Pat. No. 5,862,260): and Ser. No. 08/637,531 (now U.S. Pat. No. 5,822,436).

Having described an illustrated the principles of our invention with reference to illustrative embodiments, it should be recognized that the invention is not so limited.

For example, while certain of the embodiments were illustrated with reference to an internet-based embodiment, the same techniques are similarly applicable to any other computer-based system. Likewise, for internet-based embodiments, the use of web browsers and web pages is not essential; other digital navigation devices and other on-line data repositories can be similarly accessed.

In view of the many embodiments to which the principles of our invention may be applied, it should be recognized that the detailed embodiments are illustrative only and should not be taken as limiting the scope of our invention. Rather, we claim as our invention all such embodiments as fall within the scope and spirit of the following claims, and equivalents thereto.

We claim:

1. A method comprising:
  presenting a business card of an individual to an optical sensor, the optical sensor producing output data;
  decoding steganographically-encoded plural-bit data from the sensor output data; and
  using said plural-bit data to establish a link to an internet address having data relating to the proprietor of said business card.

2. The method of claim 1 which includes obtaining from said internet site calendar data detailing certain activities of the individual.

3. The method of claim 2 in which the amount of calendar data obtained depends on an authorization level.

4. The method of claim 3 in which the authorization level is reflected in the plural-bit data encoded in the individual's business card, wherein an individual can distribute differently-encoded cards to different recipients, to grant the recipients different access rights to said calendar data.

5. The method of claim 1 in which the optical sensor is a business card reader that also serves to input textual information from business cards into a personal information manager.

6. The method of claim 5 which includes storing an internet address discerned from the steganographically-encoded plural-bit data into said personal information manager.

7. The method of claim 1 in which the optical sensor is a digital camera.

8. The method of claim 7 in which the digital camera is mounted to a computer display device.

9. The method of claim 7 in which the digital camera is head-mounted on a user thereof.

10. The method of claim 1 in which the decoding includes sensing a subliminal graticule signal.

11. The method of claim 1 wherein the decoding includes discerning an apparent rotation of the sensor output data from an original orientation of the encoding, and compensating therefor.

12. The method of claim 11 wherein the decoding includes discerning an apparent scaling of the sensor output data from an original scale of the encoding, and compensating therefor.

13. The method of claim 1 wherein the decoding includes discerning an apparent scaling of the sensor output data from an original scale of the encoding, and compensating therefor.

14. A method comprising:
  presenting a printed promotion to an optical sensor at a first site, the optical sensor producing output data;
  decoding steganographically-encoded plural-bit data from the sensor output data;
  using said data to establish a link to an internet site relating to a company, product, or service promoted by said printed promotion; and
  transferring to from the internet site to the first site additional information relating to said company, product, or service.

15. The method of claim 14 in which the decoding includes sensing a subliminal graticule signal.

16. The method of claim 14 wherein the decoding includes discerning an apparent rotation of the sensor output data from an original orientation of the encoding, and compensating therefor.

17. The method of claim 16 wherein the decoding includes discerning an apparent scaling of the sensor output data from an original scale of the encoding, and compensating therefor.

18. The method of claim 14 wherein the decoding includes discerning an apparent scaling of the sensor output data from an original scale of the encoding, and compensating therefor.

19. A method comprising:
  presenting a printed identification badge to an optical sensor, the optical sensor producing output data corresponding to optical characteristics of the face of said badge;
  decoding steganographically-encoded plural-bit data from the sensor output data;
  checking the plural-bit data to determine whether it corresponds to a valid access card; and
  unlocking a lock depending on the outcome of the foregoing checking operation.

20. The method of claim 19 in which the decoding includes sensing a subliminal graticule signal.

21. The method of claim 19 wherein the decoding includes discerning an apparent rotation of the sensor output data from an original orientation of the encoding, and compensating therefor.

22. The method of claim 21 wherein the decoding includes discerning an apparent scaling of the sensor output data from an original scale of the encoding, and compensating therefor.

23. The method of claim 19 wherein the decoding includes discerning an apparent scaling of the sensor output data from an original scale of the encoding, and compensating therefor.

24. A business card comprising a substrate with printing thereon, characterized in that the printing includes a steganographic pattern encoding plural-bit auxiliary data, said pattern not being evident upon human inspection but being discernable by visible light scanning of the card and processing the scan data produced thereby.

25. The card of claim 24 wherein the same printing that conveys the steganographic pattern also conveys information evident upon human inspection.

26. The card of claim 25 wherein the steganographic pattern has a strength that varies across the business card in accordance with local characteristics thereof, so as to aid concealment of the encoding.

27. The card of claim 26 wherein the steganographic pattern has a strength that varies across the business card in accordance with local characteristics thereof, so as to aid concealment of the encoding.

28. The card of claim 20 wherein the steganographic pattern substantially spans the business card rather than being localized in one excerpt thereof.

* * * * *